Jan. 31, 1939.   J. F. McADAMS   2,145,814
VERTICAL BUMPER
Filed Sept. 18, 1937   2 Sheets-Sheet 1

Inventor:
James F. McAdams

Jan. 31, 1939.   J. F. McADAMS   2,145,814
VERTICAL BUMPER
Filed Sept. 18, 1937   2 Sheets-Sheet 2
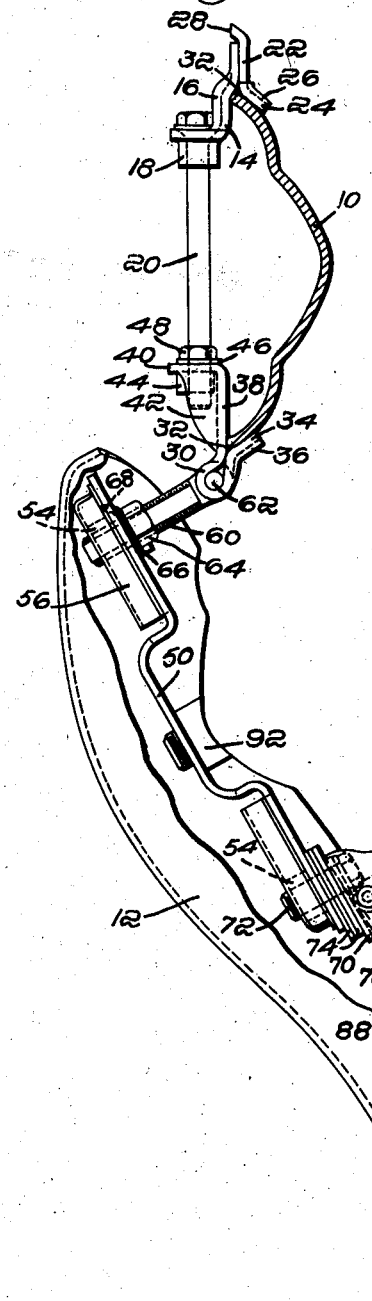
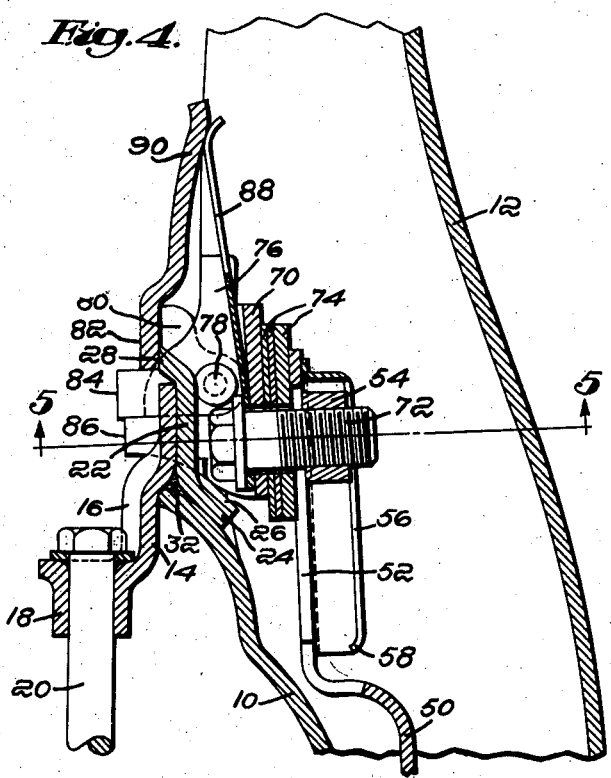
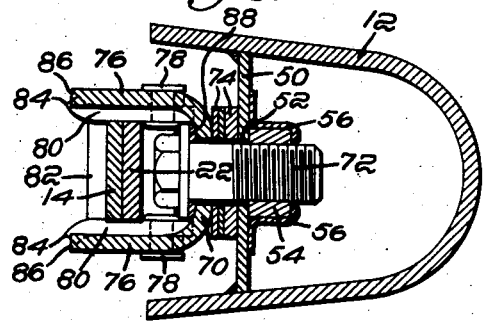
Inventor:
James F. McAdams Patented Jan. 31, 1939

2,145,814

UNITED STATES PATENT OFFICE 2,145,814

VERTICAL BUMPER

James F. McAdams, West Somerville, Mass., assignor to A. S. Campbell Co., Inc., East Boston, Mass., a corporation of Massachusetts Application September 18, 1937, Serial No. 164,505

16 Claims. (Cl. 293—55)

This invention relates to vertical bumpers for automotive vehicles and the object of the invention is to provide an improved construction for supporting such a bumper on the horizontal bumper bar of the vehicle and in particular, in its more specific aspects, to such an arrangement permitting the vertical bumper to be quickly moved away from its normal position.

My invention will be well understood by reference to the following description of an illustrative embodiment thereof shown by way of example in the accompanying drawings, wherein:—

Fig. 3 is a view similar to Fig. 2 showing the vertical bumper moved from its normal position;

Fig. 4 is a section on the line 4—4 of Fig. 2 on a larger scale;

Fig. 5 is a section on the line 5—5 of Fig. 4;

The ordinary bumper utilized on automobiles, whether in one or several parts, consists essentially of a horizontally disposed bar of limited vertical dimension extending across the width of the vehicle. Since automobiles differ in height and since even in vehicles of the same kind the elevation of the bumper above the road will vary in accordance with the load on the vehicle springs, considerable inconvenience and damage is caused by the bumper of one car passing above or below another or interlocking therewith. It has therefore become common to attach to the bumper bar vertical cross-pieces providing a surface of considerable height or depth to engage the bumper of another car and prevent such action. Such devices have been variously termed "bumper guards", "grille protectors" and "vertical pumpers". Especially when the vertical extent of such a device is considerable, it may under some circumstances form an undesirable obstruction. Thus, by way of example, when attached to the rear horizontal bumper it may lie in the path of the lid of the rear deck when the latter is opened. The specific construction which I am about to describe provides for quickly releasing the vertical bumper without completely detaching it so that it may be swung down out of the way and be quickly restored to its normal operating position.

Figure 1:
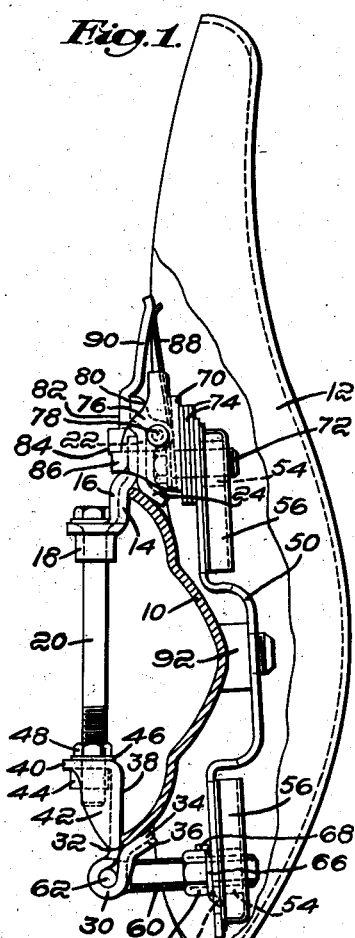
Fig. 1 is a broken side elevation of the vertical bumper mounted on the horizontal bumper bar, which latter appears in section.

Referring to the drawings, and first to Fig. 1, I there show the horizontal bumper bar 10 of an automobile to which is secured in such manner as to permit it to be released and swung to the position shown in Fig. 3 a vertical impact-receiving body 12 which may be in the form of a hollow stamping of attractive design and which normally is supported across the front face of the horizontal bumper 10 as shown in Fig. 1 of the drawings. To so support the vertical bumper 12 and to permit the movement desired there may be secured to the horizontal bar 10 a hinge element and a latch element cooperating respectively with complementary elements carried by the vertical bumper 12. Herein the former elements are secured to the edges of the horizontal bar 10 by means disposed at the rear of the same so that the front face is substantially unobstructed.

In the embodiment of the invention shown, as best seen in Figs. 3 and 4, the latch element may comprise a generally L-shaped stamping 14 having a generally vertical arm disposed across the edge of the bumper bar 10 and which may be provided with the lateral webs or flanges 16 which aid in supporting the generally horizontal arm disposed at the rear of the bumper bar 10, from which latter arm is drawn the sleeve 18 to pass and support a clamping bolt 20. Welded to the outer face of the upper end of the upright arm is a plate 22, the lower portion of which is bent forwardly to provide the bill 24 of a hook engaging the edge of the bumper bar 10. This bill may be stiffened by a central expressed rib 26 as shown. The other end of the plate 22 may project beyond the upright arm of part 14 and may be bent rearwardly at 28 to provide a beveled latch strike.

Figure 6:
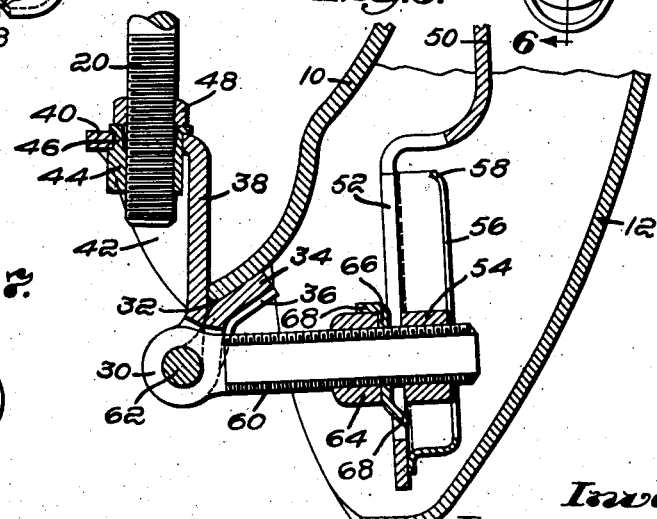
Fig. 6 is a section on the line 6—6 of Fig. 2 on a larger scale.

The lower attachment which provides the hinge support, as best seen in Figs. 1 and 6, may comprise a plate curled between its ends to provide hinge knuckles 30. The ends of the plate are welded together at 32 at the base of the knuckles and thence one end may diverge forwardly to provide the bill 34 of a hook engaging the forward face of the bumper bar 10, which likewise may be stiffened by the expressed rib 36. The other end, extending upwardly, provides the shank 38 of the hook and is provided with a rearwardly directed flange 40 pierced to pass the bolt 20. The parts 38 and 40 are braced and supported by the integral webs 42 which cooperate therewith to form a retainer for a nut 44 which receives bolt 20. Herein this nut is shown as of the type known as a "clinch-on nut", it being provided with an annular flange 46 around the threaded opening therein which may be expanded or riveted into the opening in the flange 40, and, as indicated by the asymmetrical section of Fig. 6, it may be provided with at least one flat side to cooperate with a wall of the retainer to prevent it from turning when the bolt 20 is set up. It will be seen that the two parts may be applied to the edges of the bumper and securely clamped in position by setting up the bolt 20 which may conveniently be secured by a lock nut 48. They will fit to bumpers having considerable variations in widths and since only the edges of the bumpers are engaged on the forward face, the shape of the forward face of the bumper need not be taken into account.

Figure 7:
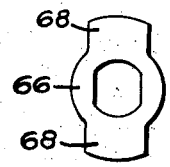
Fig. 7 is a plan of a lock washer.

Herein the vertical bumper 12 is secured to the parts just described by cooperating hinge and latch elements mounted on a plate 50 welded within the hollow of the body 12. The attachment of these cooperating elements is preferably such as to provide both for a vertical adjustment and for an adjustment fore and aft of the vehicle. Referring first to the hinge connection, as best seen from Figs. 1 and 3, the plate 50 may be provided with a vertical slot 52 behind which slides a nut 54 retained in position with freedom of vertical sliding movement but restrained from rotation by a suitable sheet metal cage 56 which may be spot welded to the forward face of the plate 52. The central portion of the plate 50 may be offset as shown and the slot continued into the more or less horizontally extending portion of the same and enlarged to permit the nut 54 to be dropped into the inner open end of the cage 56 in which it may be retained by turning over a portion of the margin of the cage at 58 to restrict the entrance opening. A bolt 60 adapted to pass through and slide vertically in the slot 52 taps into the nut 54 and its other end is formed with an eye received between the hinge knuckles 30 and adapted to receive the hinge pintle 62. The lower end of the vertical bumper is adjusted fore and aft of the vehicle or axially of the bolt by rotation of the latter, and vertical adjustment is provided by the sliding movement of the nut 54 behind the margins of the slot 52. When the proper adjustment is obtained, the parts may be locked by means of the lock nut 64. Preferably the bolt 60 is provided with flat sides fitting the corresponding opening of the lock washer 66 shown in Fig. 7, the lock washer having arms 68 which may be bent after the adjustment is made, as shown in Fig. 6, for example, to engage a flat of nut 64 and the slot 52.

The upper end of the plate, as best seen in Fig. 4, may be provided with a slot 52, a nut 54 and a retaining cage 56, in all respects like those at the lower end of the vertical bumper but reversed in position. A generally U-shaped latch carrier 70 is secured by means of the bolt 72 which passes through the web or base of the U and taps into the nut 54, suitable axial adjustment being provided for by spacers 74, one of which may be constructed to serve as a lock washer. Pivoted to the flanges 76 of the latch carrier by means of the pivots 78 is a latch proper which in itself is of a generally U-shaped form having the rearwardly directed flanges 80 received between the flanges 76 and of such a width as to pass on either side of the strike 28 while the web 82 connecting these flanges is adapted to pass over the strike and come to rest behind the same, as seen in Fig. 4. Preferably the web is cut away at its lower portion and below the edge thus provided the sides 80 are extended to provide laterally diverging lugs 84, as best seen in Fig. 5, which cooperate with the sides of the strike to guide the parts as they approach the latching position and relatively to center them. The sides 76 of the carrier 70 are provided with extensions 86 underriding and supporting these outwardly bent lugs 84 and thus providing stops limiting the counter-clockwise rotation of the latch, viewing Fig. 4, under the influence of the latch spring 88.

Figure 2:
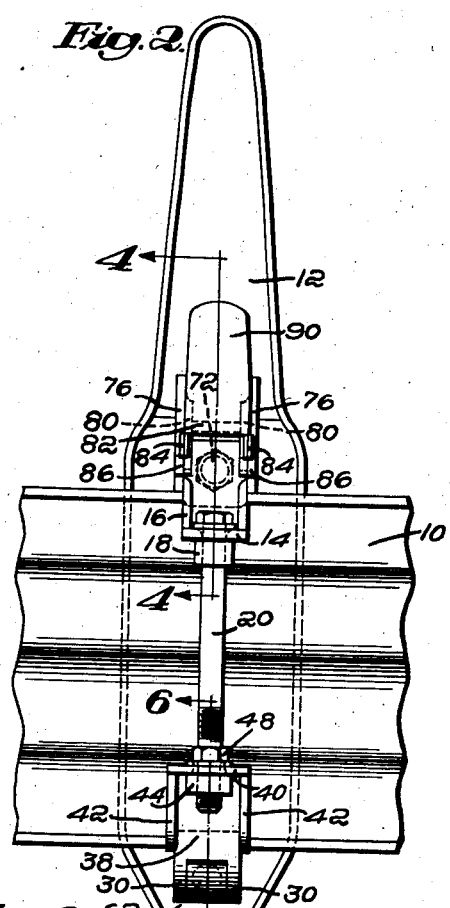
Fig. 2 is a rear view.

The web of the latch may be extended upwardly to form the operating lever 90 which, as will be apparent from Figs. 1, 2 and 4 of the drawings, is so arranged that it may be encircled together with the upper portion of the vertical bumper 12 by a grasping hand to permit the latch to be rocked clockwise, viewing Fig. 4, to release the same from the latched position there illustrated.

I herein show a compressible rubber bumper 92 mounted on the central portion of the plate 50 and adapted to bear against the front of the bumper bar 10 and to be compressed in the latched position of the parts. A firm, non-rattling mounting for the vertical bumper is thus provided for.

Referring to Fig. 3, it may be noted that the attaching means illustrated provides for a very small projection of the strike element 28 above the upper edge of the horizontal bumper bar 10, thus permitting the rear deck or other movable member to pass the bumper with very slight clearance. Similarly the hinge knuckles 30 have no obstructions adjacent the same and the vertical bumper 12 may swing freely to and beyond such a position as is shown in Fig. 3, entirely beneath the bumper 10, thus not only clearing the space above that bar but avoiding any objectionable projection to the right of it, viewing Fig. 3.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. A vertical bumper for automobiles comprising a pair of hook members having forwardly facing bills to engage the edges of a horizontal bumper bar and shanks disposed at the rear of the bar, means connecting the shanks to draw the bills into clamping engagement with the bar, the backs of the hooks having projecting portions, a vertical impact-receiving body and means for securing it to said portions to position it at the front of the bar.

2. A vertical bumper for automobiles comprising a pair of hook members having forwardly facing bills to engage the edges of a horizontal bumper bar and shanks disposed at the rear of the bar, means connecting the shanks to draw the bills into clamping engagement with the bar, the backs of the hooks having projecting portions, a vertical impact-receiving body and means for securing it to said portions to position it at the front of the bar comprising screws connected to one of the parts by means permitting vertical adjusting movement of their axes relative thereto.

3. A vertical bumper for automobiles comprising a pair of hook members having forwardly facing bills to engage the edges of a horizontal bumper bar and shanks disposed at the rear of the bar, means connecting the shanks to draw the bills into clamping engagement with the bar, the backs of the hooks having projecting portions, a vertical impact-receiving body and means for securing it to said portions to position it at the front of the bar comprising screws having a threaded connection with the body to provide for longitudinal adjustment thereof and at the rear ends means providing respectively for a hinging connection with one of the said parts and a releasable latching connection with the other.

4. A vertical bumper for automobiles comprising a pair of hook members having forwardly facing bills to engage the edges of a horizontal bumper bar and shanks disposed at the rear of the bar, means connecting the shanks to draw the bills into clamping engagement with the bar, the backs of the hooks having projecting portions providing respectively an element of a hinge and a latch strike, a vertical impact-receiving body carrying adjacent one end a hinge element to cooperate with the hinge element on the hook member and adjacent the other end a latch to cooperate with said strike.

5. A vertical bumper for automobiles adapted to be swingingly mounted transversely of a horizontal bumper bar which presents at its edges respectively a hinge element and a latch element comprising a vertical impact-receiving body having at its rear adjacent one end thereof a cooperating latch element and adjacent its other end a threaded member mounted for movement longitudinally of the body, a cooperating threaded member providing for axial adjustment of the second relatively to the first, means for fixing the axial adjustment and a cooperating hinge element carried by said second threaded member.

6. A vertical bumper for automobiles adapted to be swingingly mounted transversely of a horizontal bumper bar which presents at its edges respectively a hinge element and a latch element comprising a vertical impact-receiving body having at its rear adjacent one end thereof a cooperating hinge element and adjacent its other end a threaded member mounted for movement longitudinally of the body, a cooperating threaded member providing for axial adjustment of the second relatively to the first, means for fixing the axial adjustment and a cooperating latch element carried by said second threaded member.

7. An automobile bumper construction comprising, in combination with a horizontal bumper bar having projecting from the horizontal edges thereof respectively a hinge element and a latch element, a vertical impact-receiving body presenting rearwardly adjacent an end thereof a mating hinge element and adjacent the other end a pivoted latch to engage with the first mentioned latch element, said pivoted latch including a lever portion projecting at the rear of the vertical body to be encircled therewith by a grasping hand to move the latch from one position to another.

8. An automobile bumper construction comprising, in combination with a horizontal bumper bar having projecting from the horizontal edges thereof respectively a hinge element and an element of a spring latch, a vertical impact-receiving body presenting rearwardly adjacent an end thereof a mating hinge element and adjacent the other end a pivoted latch to engage with the first mentioned latch element, said pivoted latch including a lever portion projecting at the rear of the vertical body to be encircled therewith by a grasping hand to move the latch from one position to another.

9. An automobile bumper construction comprising, in combination with a horizontal bumper bar having projecting from the horizontal edges thereof respectively a hinge element and a latch element, a vertical impact-receiving body presenting rearwardly adjacent an end thereof a mating hinge element and adjacent the other end a cooperating latch element to engage with the first mentioned latch element and a compressible member mounted to lie between the bumper bar and the body in the latched position of the body and in such position of the body being under compression to exert a tension thereon normally tending to separate the parts of the engaged latch and being resisted thereby.

10. A vertical bumper for automobiles adapted to be swingingly mounted transversely of a horizontal bumper bar which presents at its edges respectively a hinge element and a latch strike comprising a vertical impact-receiving body having at its rear adjacent one end thereof a cooperating hinge element and adjacent the other end rearwardly projecting upright flanges, a generally channel-shaped latch having its sides pivoted to said flanges and of a width to embrace the strike to permit its web to close behind the same.

11. A vertical bumper for automobiles adapted to be swingingly mounted transversely of a horizontal bumper bar which presents at its edges respectively a hinge element and a latch strike comprising a vertical impact-receiving body having at its rear adjacent one end thereof a cooperating hinge element and adjacent the other end rearwardly projecting upright flanges, a generally channel-shaped latch having its sides pivoted to said flanges and of a width to embrace the strike to permit its web to close behind the same, the web being cut away to provide an edge to pass over the strike, portions of the sides below said edge being flared outwardly and rearwardly to guide the sides of the strike in the closing movement.

12. A vertical bumper for automobiles adapted to be swingingly mounted transversely of a horizontal bumper bar which presents at its edges respectively a hinge element and a latch strike comprising a vertical impact-receiving body having at its rear adjacent one end thereof a cooperating hinge element and adjacent the other end rearwardly projecting upright flanges, a generally channel-shaped latch having its sides pivoted to said flanges and of a width to embrace the strike to permit its web to close behind the same, the web being cut away to provide an edge to pass over the strike, portions of the sides below said edge being flared outwardly and rearwardly to guide the sides of the strike in the closing movement, the flanges having projections cooperating with said outturned parts to form stops limiting the pivoting movement of the latch.

13. A vertical bumper for automobiles adapted to be swingingly mounted transversely of a horizontal bumper bar which presents at its edges respectively a hinge element and a latch strike comprising a vertical impact-receiving body having at its rear adjacent one end thereof a cooperating hinge element and adjacent the other end rearwardly projecting upright flanges, a generally channel-shaped latch having its sides pivoted to said flanges and of a width to embrace the strike to permit its web to close behind the same, the flanges having projections providing stops for the sides of the latch to limit its pivoting movement.

14. A vertical bumper for automobiles adapted to be swingingly mounted transversely of a horizontal bumper bar which presents at its edges respectively a hinge element and a latch strike comprising a vertical impact-receiving body having at its rear adjacent one end thereof a cooperating hinge element and adjacent the other end a pivoted latch having an edge to pass over and behind the strike and laterally and below the same outwardly and rearwardly parts to guide the sides of the strike in closing movement.

15. A strike element for attachment to the edge of a horizontal bumper bar for latching a swinging vertical impact-receiving body thereto comprising a generally L-shaped plate having an arm to lie across the edge of the bar and an arm having means for engagement with a clamping device, a second plate secured to the first arm and having an inner portion diverging therefrom to form therewith a hook to engage over the bumper edge and an outer portion extending beyond the first arm and inclined oppositely to the inner portion to form a bevelled strike.

16. A hinge element for attachment to a horizontal bumper for securing thereto a vertical impact-receiving member comprising a plate bent centrally to provide hinge knuckles, the sides of the plate being united beyond the knuckles and extended in diverging relation, one providing the bill of a hook to engage the edge of the horizontal bumper bar and the other providing the shank of the hook and being terminally bent to provide a retainer for a nut.

JAMES F. McADAMS.